United States Patent [19]

Ogawa et al.

[11] 4,349,304

[45] Sep. 14, 1982

[54] AUTOMATIC GLASS PLATE PILING APPARATUS

[75] Inventors: Hiroyuki Ogawa; Haruhiko Kaki, both of Kanagawa, Japan

[73] Assignee: Asahi Glass Company, Ltd., Tokyo, Japan

[21] Appl. No.: 79,199

[22] Filed: Sep. 26, 1979

Related U.S. Application Data

[63] Continuation of Ser. No. 939,736, Sep. 5, 1978, abandoned.

[30] Foreign Application Priority Data

Apr. 8, 1976 [JP] Japan .................................. 51-38706

[51] Int. Cl.³ .............................................. B65G 57/00
[52] U.S. Cl. ...................................................... 414/106
[58] Field of Search ................ 271/180, 181, 185, 200, 271/70, 72, 83; 414/38, 39, 106, 107

[56] References Cited

U.S. PATENT DOCUMENTS

| | | | |
|---|---|---|---|
| 3,410,425 | 11/1968 | Guillaume | 214/7 |
| 3,541,597 | 11/1970 | Segawa et al. | 214/7 |
| 3,679,076 | 7/1972 | Miller et al. | 214/7 |
| 3,682,329 | 8/1972 | Dean | 214/7 |
| 3,934,871 | 1/1976 | Dean | 214/7 |

*Primary Examiner*—Joseph F. Peters, Jr.
*Assistant Examiner*—Ross Weaver
*Attorney, Agent, or Firm*—Oblon, Fisher, Spivak, McClelland & Maier

[57] ABSTRACT

An automatic glass plate piling apparatus includes a feeding conveyor for conveying a glass plate in the horizontal direction; a turning frame pivoted at an end of the conveyor so as to receive the glass plate transferred from the conveyor and to turn it at a predetermined angle; a transfer frame disposed below the turning frame to receive the glass plate from the turning frame at the time of about the end of the turning operation; and a horizontal transfer conveyor for supporting the lower edge of the glass plate transferred to the transfer frame, whereby the glass plate is transferred from the turning frame to the transfer frame and the horizontal transfer conveyor transfers the glass plate to a pallet by the turning operation of the transfer frame and the forward movement of the horizontal transfer conveyor.

5 Claims, 4 Drawing Figures

AUTOMATIC GLASS PLATE PILING APPARATUS

This is a continuation of application Ser. No. 939,736 filed Sept. 5, 1978 now abandoned, and Ser. No. 779,941 filed Mar. 21, 1977 now abandoned.

BACKGROUND OF THE INVENTION

1. Field of the Invention

The present invention relates to an automatic glass plate piling apparatus.

2. Description of the Prior Arts

Various apparatuses for automatically piling glass plates in a vertically standing condition on a pallet such as a usual pallet, a packaging box or a load table by a turning frame to receive the glass plate transferred in a horizontal direction have been known. However, these conventional apparatuses have not been suitable for precisely piling curved window glass plates as shown in FIG. 1.

SUMMARY OF THE INVENTION

It is an object of the present invention to provide an automatic glass plate piling apparatus for precisely piling glass plates in vertical standing condition on a pallet by receiving each glass plate transferred in horizontal direction.

The foregoing and other objects of the present invention have been attained by providing a an automatic glass plate piling apparatus wherein the glass plate transferred in horizontal direction is transferred through a turning frame on a horizontal transfer conveyor and a transfer frame which is turnable under lifting or falling, and the lower edge of the glass plate is held by the horizontal transfer conveyor and the rear surface of the glass plate is held by the transfer frame and the glass plate is vertically piled by the lifting operation of the transfer frame and forwardly moving operation of the horizontal transfer conveyor.

BRIEF DESCRIPTION OF THE DRAWINGS

Various objects, features and advantages of the present invention will be more fully appreciated as the same becomes better understood from the following detailed description when considered in connection with the accompanying drawings, in which like reference characters designate like or corresponding parts throughout the several views and wherein.

DETAILED DESCRIPTION OF THE PREFERRED EMBODIMENTS

Figure 1:
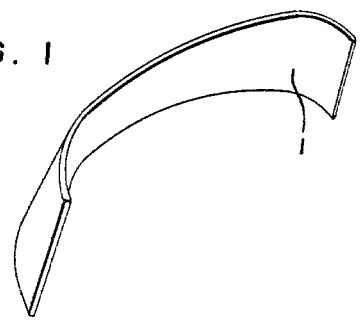
FIG. 1 is a schematic view of a curved window glass plate for an automobile.

Referring now to the drawings, one embodiment of the apparatus of the present invention will be illustrated.

In the embodiment, the curved window glass plate for an automobile shown in FIG. 1 is loaded on a load table e.g. a L-shape pallet. Thus, the present invention can be also applied for a flat plate.

In the apparatus of the present invention, a conveyor (2) for horizontally feeding a glass plate (1), is mounted on a bed which is held on rails (15). Various types of the conveyors can be used. The belt conveyor or the rope conveyor shown in the drawings is preferably used.

A turning frame (3) is pivoted at the end of the conveyor (2) and is turnable to lower direction at a predetermined angle around the pivot by the action of a cylinder (13) under the condition of holding the glass plate (1) transferred from the conveyor (2).

In the optimum embodiment, the turning frame (3) is equipped with a conveyor such as a left conveyor for forwardly moving the glass plate (1). The turning frame with the conveyor is referred to as a turning conveyor. A stopper (5) is provided on the turning conveyor at the end for supporting the glass plate (1) during the turning operation.

A horizontal transfer conveyor (7) and a transfer frame (8) which are held on the bed of the feeding conveyor (2) by arms (21), (22) are disposed below the turning conveyor (3) in order to vertically load the glass plate (1) from the surface of the turning conveyor to a L-shape pallet (6).

The horizontal transfer conveyor (7) provides on the lower end of the transfer frame (8) and has a endless conveyor comprising a plurality of belts or ropes which are horizontally held along the receiving surface of the L-shape pallet (6), and is forwardly driven to the L-shape pallet (6) under receiving the lower edge of the glass plate (1) by a motor (10) connected to the arm (22).

On the other hand, the transfer frame (8) is disposed so as to be turnable under lifting or falling around the horizontal axis (9) on the horizontal transfer conveyor by a cylinder (12) and it is held in the condition of falling at the position in the end of the turning operation of the turning conveyor (3) whereby the glass plate (1) on the turning conveyor (3) is transferred on the rollers (11) of the transfer frame (8).

Of course, the turning conveyor (3) and the transfer frame (8) are disposed so that the turning operation of the turning conveyor (3) is not prevented by the transfer frame (8) and the horizontal transfer conveyor (7). Thus, the glass plate (1) on the turning conveyor (3) is automatically transferred to the transfer frame (8) and the horizontal transfer conveyor (7) at the substantial end of the turning operation. The lower edge of the glass plate (1) is held by the horizontal transfer conveyor (7) and the rear surface of the glass plate (1) is held by the transfer frame (8).

Figure 3:
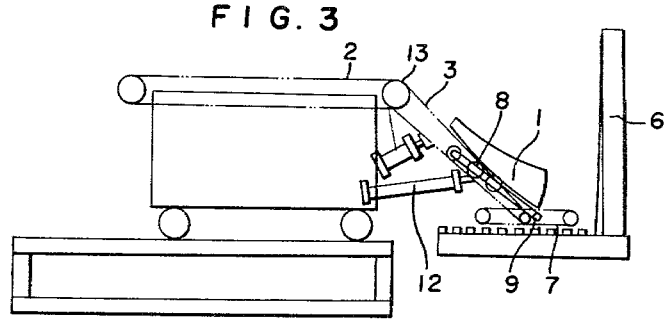
FIGS. 3 and 4 are respectively side views showing the operation of the apparatus.
Figure 4:
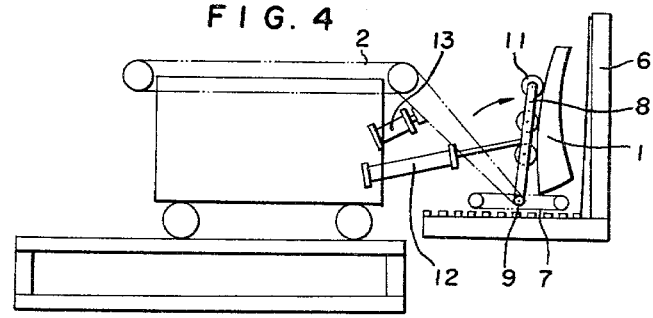

FIG. 3 shows the state of the apparatus that the glass plate (1) is transferred from the turning frame (3) to the transfer frame (8) and the horizontal transfer conveyor (7) and is held on them.

In the condition, the cylinder (12) is operated to turn the transfer frame (8) around the horizontal axis (9) to stand up and the horizontal transfer conveyor is forwardly moved whereby the glass plate (1) is forwardly moved under standing it up in the vertical direction and is transferred on the L-shape pallet. That is, the transfer frame (8) and the horizontal transfer conveyor (7) are cooperated to forwardly move under supporting the glass plate without overturning it. When the glass plate (1) is transferred from the front edge of the horizontal tranfer conveyor (7) to the pallet (6), the transfer frame (8) is operated as a pusher to push the glass plate (1) to the pallet (G).

In the case, when the glass plate (1) is precisely transferred on the pallet, it is important to place the front end of the horizontal transfer conveyor (7) to the position for piling it on the pallet (6).

That is, the position of the glass plate (1) piled on the pallet (6) is decided depending upon the position of transferring the glass plate (1) from the horizontal transfer conveyor (7).

Accordingly, when the front end of the horizontal transfer conveyor (7) is adjusted, the glass plate (1) can be piled at the predetermined position on the pallet (G). Accordingly, the apparatus is moved through a screwing mechanism (18) and gears (19), (20) by a motor (16), etc. on the rails when each plate (1) is piled or each glass plate (1) is intended to be piled.

Thus, in the embodiment of the present invention, the height of the horizontal transfer conveyor (7) is adjusted to the level of the receiving surface of the pallet (6).

When the height of the conveyor is higher than the level of the receiving surface of the pallet (6), the distance for dropping the glass plate is large to cause breaking of the glass plate. When the height of the conveyor is lower than the level of the receiving surface of the pallet (6), the conveyor or the lower edge of the glass plate is contacted to the receiving surface of the holder whereby the forward movement of the glass plate (1) is not smoothly carried out.

Figure 2:
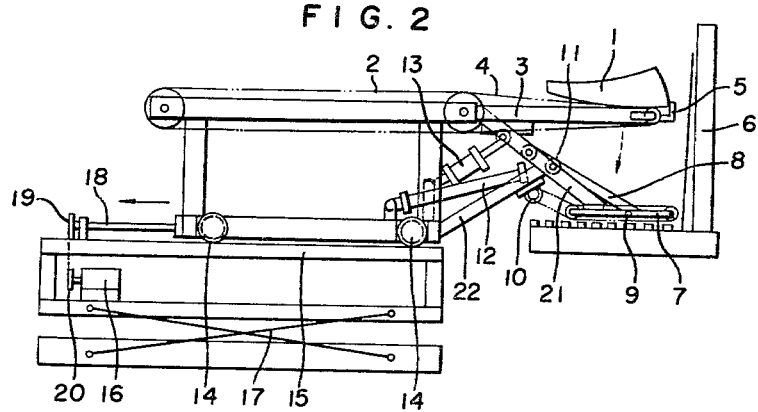
FIG. 2 is a side view of an automatic glass plate piling apparatus according to the present invention.

In FIG. 2, the reference (17) designates means for adjusting the height of the conveyor by vertically moving it.

Thus, it is also possible to vertically move only the horizontal transfer conveyor (7) by adjusting the arms (21), (22) in expansion and contraction so as to attain the purpose. This embodiment is not shown in the drawings.

As described above, in accordance with the present invention, the glass plate is piled by using the horizontal transfer conveyor and the transfer frame. In the apparatus of the present invention, the lower edge of the glass plate can be forwardly moved under supporting it by the horizontal transfer conveyor at the time transferring the glass plate whereby the glass plate can be smoothly and precisely transferred to the pallet.

What is claimed is:

1. An automatic glass plate piling apparatus comprising:
   a feeding conveyor for conveying a glass plate in the horizontal direction;
   a turning frame pivoted at an end of said conveyor so as to receive said glass plate transferred from said conveyor and to turn it downwardly at a predetermined angle;
   a transfer frame disposed below said turning frame so as to receive and support the rear of said glass plate from said turning frame at about the time of the end of the turning operation;
   a horizontal transfer conveyor comprising
   a plurality of horizontal endless conveyors provided on the lower end of the transfer frame so as to support the lower edge of the glass plate transferred to the transfer frame; and
   means for simultaneously turning said transfer frame about a horizontal axis to cause said transfer frame to stand up and to move said horizontal transfer conveyor forward and the cooperative action of the turning of the transfer frame and the movement of the horizontal transfer conveyor acts to drive said glass plate against a pallet,
   whereby said lower edge of said glass plate is maintained forward of the center of gravity of said glass plate by the movement of said horizontal transfer conveyor during said turning of said transfer frame.

2. The automatic glass plate piling apparatus cited in claim 1 including:
   a stopper for supporting a front edge of said glass plate during the turning operation provided at the end of said turning frame.

3. The automatic glass plate piling apparatus recited in claim 1 wherein:
   the apparatus is reciprocally moved toward said pallet.

4. The automatic glass plate piling apparatus recited in claim 1 wherein:
   said turning frame has a conveyor for forwardly moving said glass plate transferred from the feeding conveyor.

5. The automatic glass plate piling apparatus of claim 1 wherein said transfer frame pivots about an axis on said horizontal transfer conveyor.

* * * * *